(12) United States Patent
Akah et al.

(10) Patent No.: US 11,370,975 B2
(45) Date of Patent: Jun. 28, 2022

(54) STEAM-ENHANCED CATALYTIC CRACKING OF HYDROCARBONS TO PRODUCE LIGHT OLEFINS

(71) Applicant: SAUDI ARABIAN OIL COMPANY, Dhahran (SA)

(72) Inventors: Aaron Akah, Dhahran (SA); Musaed Salem Al-Ghrami, Dhahran (SA); Qi Xu, Dhahran (SA)

(73) Assignee: SAUDI ARABIAN OIL COMPANY

( * ) Notice: Subject to any disclaimer, the term of this patent is extended or adjusted under 35 U.S.C. 154(b) by 0 days.

(21) Appl. No.: 17/039,998

(22) Filed: Sep. 30, 2020

(65) Prior Publication Data

US 2022/0098493 A1 Mar. 31, 2022

(51) Int. Cl.
*C10G 11/18* (2006.01)
*B01J 29/46* (2006.01)
(Continued)

(52) U.S. Cl.
CPC ............. *C10G 11/18* (2013.01); *B01J 29/088* (2013.01); *B01J 29/405* (2013.01); *B01J 29/46* (2013.01); *B01J 29/90* (2013.01); *B01J 38/06* (2013.01); *B01J 38/16* (2013.01); *C10G 11/05* (2013.01); *C10G 11/182* (2013.01); *C10G 51/06* (2013.01);
(Continued)

(58) Field of Classification Search
CPC ......... C10G 11/04; C10G 11/05; C10G 11/18; C10G 11/182; C10G 51/06; B01J 29/46; B01J 29/107; B01J 29/7007
See application file for complete search history.

(56) References Cited

U.S. PATENT DOCUMENTS 5,523,502 A * 6/1996 Rubin ..................... C07C 11/04
568/697
8,658,023 B2 2/2014 Coleman
(Continued)

OTHER PUBLICATIONS

Corma et al., "Steam catalytic cracking of naphtha over ZSM-5 zeolite for production of propene and ethene: Micro and macroscopic implications of the presence of steam", Applied Catalysis A: General, 2012, pp. 220-235.
(Continued)

*Primary Examiner* — Renee Robinson
(74) *Attorney, Agent, or Firm* — Bracewell LLP; Constance Gall Rhebergen

(57) ABSTRACT

A steam-assisted catalytic cracking process for a hydrocarbon feed is provided. The process includes: introducing the hydrocarbon feed, a fluid catalytic cracking (FCC) catalyst, and steam to a FCC reactor with a mass ratio of steam to hydrocarbon feed between 0.05 and 1.0; cracking the hydrocarbon feed in the presence of the FCC catalyst and steam to produce a cracked hydrocarbon feed and spent FCC catalyst, the spent FCC catalyst comprising coke deposits and hydrocarbon deposits; stripping the hydrocarbon deposits from the spent FCC catalyst with steam in a stripper to obtain a hydrocarbon-stripped spent FCC catalyst; regenerating the hydrocarbon-stripped spent FCC catalyst in a regenerator by subjecting the stripped spent FCC catalyst to heat in the presence of oxygen to combust the coke deposits on the stripped spent FCC catalyst and produce a regenerated FCC catalyst; recycling the regenerated FCC catalyst.

23 Claims, 4 Drawing Sheets

(51) Int. Cl.
    *B01J 29/90*    (2006.01)
    *B01J 38/06*    (2006.01)
    *B01J 38/16*    (2006.01)
    *C10G 51/06*    (2006.01)
    *C10G 11/05*    (2006.01)
    *B01J 29/40*    (2006.01)
    *B01J 29/08*    (2006.01)

(52) U.S. Cl.
    CPC ........... *C10G 2300/4006* (2013.01); *C10G 2300/4018* (2013.01); *C10G 2300/4025* (2013.01); *C10G 2300/701* (2013.01); *C10G 2300/708* (2013.01); *C10G 2300/807* (2013.01); *C10G 2400/20* (2013.01)

(56) References Cited

U.S. PATENT DOCUMENTS

| | | |
|---|---|---|
| 9,290,705 B2 | 3/2016 | Bourane et al. |
| 9,433,912 B2 | 9/2016 | Subramani et al. |
| 9,434,892 B2 | 9/2016 | Pradeep et al. |
| 9,567,272 B2 | 2/2017 | Mehlberg et al. |
| 9,981,888 B2 | 5/2018 | Al-Herz et al. |
| 10,280,372 B2 | 5/2019 | Sarkar et al. |
| 10,427,142 B1 | 10/2019 | Al-Herz et al. |
| 2009/0134065 A1* | 5/2009 | Cheng .............. B01J 29/80 208/114 |
| 2015/0152027 A1 | 6/2015 | Shafi et al. |
| 2018/0237702 A1 | 8/2018 | Akah et al. |
| 2018/0305623 A1 | 10/2018 | Al-Ghrami et al. |
| 2018/0346827 A1* | 12/2018 | Al-Ghamdi ............ B01J 8/1809 |
| 2019/0016977 A1 | 1/2019 | Shaik et al. |
| 2019/0225894 A1 | 7/2019 | Bourane et al. |

OTHER PUBLICATIONS

PCTUS2021052281 International Search Report and Written Opinion dated Dec. 20, 2021, 14 pgs.

\* cited by examiner

STEAM-ENHANCED CATALYTIC CRACKING OF HYDROCARBONS TO PRODUCE LIGHT OLEFINS

BACKGROUND OF THE INVENTION

1. Technical Field

The disclosure relates to a process for steam-assisted catalytic cracking of hydrocarbons to obtain light olefin products. More specifically, the disclosure relates to a process for high-severity steam-assisted catalytic cracking of crude oil to obtain light olefin products.

2. Discussion of Related Art

Fluid catalytic cracking (FCC) processes available for converting heavy hydrocarbons into light olefins. In conventional FCC systems, a preheated hydrocarbon feed is sprayed into the base of a FCC riser via feed nozzles, where it contacts fluidized catalysts at a temperature in the range of 500-650° C. The hydrocarbon feed is vaporized and its constituent molecules are reacted in the presence of the catalyst to obtain lighter, more valuable compounds such as light petroleum gas, gasoline, and diesel.

In the process of cracking the hydrocarbon feed, coke deposits form on the catalyst and reduce the activity and selectivity of the catalyst. The spent catalyst is sent to a stripper, where it is contacted with steam (or in some cases a mixture of air and oxygen) to extract any remaining hydrocarbons and regenerate the catalyst by combusting coke deposits in the pores of the catalyst. The regenerated catalyst is then returned to the riser to be reused in the FCC process.

While conventional FCC processes are more energy efficient than steam cracking, their use is typically limited to hydrocarbon feeds having limited amounts of contaminants such as coke, acids, and poisoning metals.

SUMMARY OF THE INVENTION

Disclosed are processes for steam-assisted catalytic cracking of hydrocarbons, such as crude oil and natural gas condensate. The disclosed processes are optimized to directly convert whole crude oil and natural gas condensate into light olefin products and other products.

A steam-assisted catalytic cracking process for obtaining light olefin products from a hydrocarbon feed is disclosed. The steam-assisted catalytic cracking process includes the steps of: introducing the hydrocarbon feed, a FCC catalyst, and steam to a downflow FCC reactor with a mass ratio of steam-to-hydrocarbon feed that is between 0.05 and 1.0; cracking the hydrocarbon feed in the presence of the FCC catalyst and steam in the downflow FCC reactor at a cracking temperature to produce a cracked hydrocarbon feed and spent FCC catalyst, the cracked hydrocarbon feed comprising light olefin products and the spent FCC catalyst comprising coke deposits and hydrocarbon deposits; stripping the hydrocarbon deposits from the spent FCC catalyst with steam in a stripper to obtain a hydrocarbon-stripped spent FCC catalyst; regenerating the hydrocarbon-stripped spent FCC catalyst in a regenerator by subjecting the stripped spent FCC catalyst to heat in the presence of oxygen to combust the coke deposits on the stripped spent FCC catalyst and produce a regenerated FCC catalyst; recycling the regenerated FCC catalyst to the downflow FCC reactor.

The cracking temperature can be between 600° C. and 750° C. The hydrocarbon feed can have a residence time between 0.05 and 10 seconds in the downflow FCC reactor. The FCC catalyst can include a modified catalyst; the modified catalyst having a zeolite impregnated with phosphorous and a metal oxide. The modified catalyst can include between 1 and 20 wt % phosphorous pentoxide ($P_2O_5$). The zeolite can be selected form the group consisting of zeolite socony mobil-5 (ZSM-5), zeolite beta, and ultrastable zeolite Y. According to at least one embodiment, the modified catalyst can include between 0.5 and 5 wt % metal oxides. The metal oxide can include a metal in a +3 oxidation state. The metal oxide can include a metal selected from the group consisting of iron (III), nickel (III), lanthanum (III), cerium (III), and combinations of the same. The hydrocarbon feed can include a hydrocarbon selected from the group consisting of natural gas condensate and whole crude oil. According to at least one embodiment, the process can include the step of fractionating the cracked hydrocarbon feed to obtain the light olefin products.

A steam-assisted catalytic cracking process for obtaining light olefin products from a hydrocarbon feed is also disclosed. The process includes the steps of: separating the hydrocarbon feed to obtain a light hydrocarbon feed and a heavy hydrocarbon feed; introducing the light hydrocarbon feed, a FCC catalyst, and steam to a first downflow FCC reactor, wherein a mass ratio of steam to light hydrocarbon feed that is between 0.5 and 1.0 and wherein the FCC catalyst comprises a modified catalyst that comprises a zeolite that is impregnated with phosphorus and a metal oxide; cracking the light hydrocarbon feed in the presence of the FCC catalyst and steam in the first downflow FCC reactor at a first cracking temperature to produce a first cracked hydrocarbon feed and first spent FCC catalyst; introducing the heavy hydrocarbon feed, the FCC catalyst, and steam with a mass ratio of steam to heavy hydrocarbon feed that is between 0.3 and 0.1 to a second downflow FCC reactor; cracking the heavy hydrocarbon feed in the presence of the FCC catalyst and steam in the second downflow FCC reactor at a second cracking temperature to produce a second cracked hydrocarbon feed and second spent FCC catalyst; wherein the light hydrocarbon feed and the heavy hydrocarbon feed comprise light olefin products, and the first spent FCC catalyst and the second spent FCC catalyst comprise coke deposits and hydrocarbon deposits; stripping the hydrocarbon deposits from the first spent FCC catalyst and second spent FCC catalyst with steam to obtain a first hydrocarbon-stripped spent FCC catalyst and a second hydrocarbon-stripped spent FCC catalyst, respectively; regenerating the first hydrocarbon-stripped spent FCC catalyst and the second hydrocarbon-stripped spent FCC catalyst to obtain a regenerated FCC catalyst.

The step of separating the hydrocarbon feed to obtain a light hydrocarbon feed and a heavy hydrocarbon feed can be carried out using a cut point temperature between 330° C. and 380° C. The first cracking temperature can be between 630° C. and 750° C. The second cracking temperature can be between 600° C. and 720° C. The light hydrocarbon feed and the heavy hydrocarbon feed can have a residence time in the first downflow FCC reactor and second downflow FCC reactor respectively that is between 0.05 and 10 seconds. The modified catalyst can include between 1 and 20 wt % phosphorus pentoxide ($P_2O_5$). According to at least on embodiment, the zeolite can be selected from the group consisting of ZSM-5, zeolite beta, and ultrastable zeolite Y. The modified catalyst can include between 0.5 and 5 wt % metal oxides. The metal oxide can include a metal in a +3 oxidation state. The metal oxide can include a metal selected from the group consisting of iron (III), nickel (III), lanthanum (III), cerium (III), and combinations of the same. The hydrocarbon feed can include a hydrocarbon selected from the group consisting of natural gas condensate and whole crude oil. According to at least one embodiment, the spent FCC catalyst can be gravity-fed to the stripper.

BRIEF DESCRIPTION OF THE DRAWINGS

The embodiments disclosed will be understood by the following detailed description along with the accompanying drawings. The embodiments shown in the figures only illustrate several embodiments of the disclosure. The disclosure admits of other embodiments not shown in the figures, and is not limited to the content of the illustrations. In the accompanying figures, similar components, features, or both may have similar reference labels.

DETAILED DESCRIPTION OF THE DRAWINGS

Figure 1:
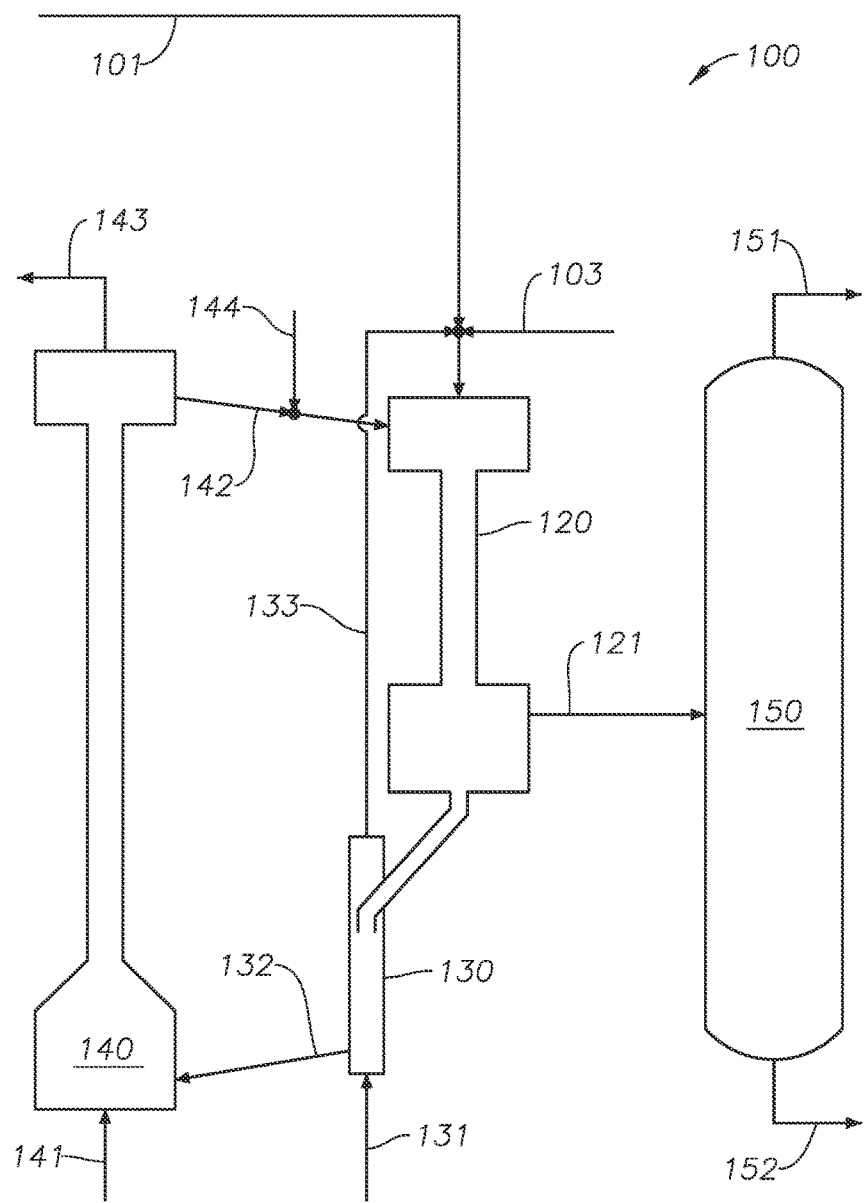
FIG. 1 is a diagram of an embodiment of a steam-assisted catalytic cracking process for obtaining light olefin products from a hydrocarbon feed.

For certain embodiments, many details are provided for thorough understanding of the various components or steps. In other instances, known processes, devices, compositions, and systems are not described in particular detail so that the embodiments are not obscured by detail. Likewise, illustrations of the various embodiments can omit certain features or details so that the various embodiments are not obscured.

The drawings provide an illustration of certain embodiments. Other embodiments can be used, and logical changes can be made without departing from the scope of this disclosure. The following detailed description and the embodiments it describes should not be taken in a limiting sense. This disclosure is intended to disclose certain embodiments with the understanding that many other undisclosed changes and modifications can fall within the spirit and scope of the disclosure. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The description can use the phrases "in some embodiments," "in various embodiments," "in an embodiment," "in at least one embodiment," or "in embodiments," which can each refer to one or more of the same or different embodiments. Furthermore, the terms "comprising," "including," "having," and the like, as used with respect to embodiments of the present disclosure are synonymous.

In this disclosure and the appended claims, unless otherwise indicated, all numbers expressing quantities, percentages or proportions, and other numerical values used in the specification and claims are to be understood as being modified in all instances by the term "about." The term "about" applies to all numeric values, whether or not explicitly indicated. Values modified by the term "about" can include a deviation of at least ±5% of the given value unless the deviation changes the nature or effect of the value such that it is not operable to achieve its intended purpose.

Ranges can be expressed in this disclosure as from about one particular value and to about another particular value. With these ranges, another embodiment is from the one particular value to the other particular value, along with all combinations within the range. When the range of values is described or referenced in this disclosure, the interval encompasses each intervening value between the upper limit and the lower limit, as well as the upper limit and the lower limit; and includes lesser ranges of the interval subject to any specific exclusion provided.

Unless otherwise defined, all technical and scientific terms used in this specification and the appended claims have the same meanings as commonly understood by one of ordinary skill in the relevant art.

Ordinal numbers (such as "first," "second," "third," and so on), when used in this disclosure as an adjective before a term, merely identify a particular component, feature, step, or combination of these unless expressly provided otherwise. At times, ordinal numbers may be used to distinguish a particular feature, component, or step from another feature, component, or step that is described by the same term or similar term. Unless expressly provided otherwise, ordinal numbers do not indicate any relationship, order, quality, ranking, importance, or characteristic between features, components, steps, or combinations of these. Moreover, ordinal numbers do not define a numerical limit to the features, components, steps, or combination they identify.

Where a method comprising two or more defined steps is recited or referenced in this disclosure, or the appended claims, the defined steps can be carried out in any order or simultaneously except where the context excludes that possibility.

In the figures, fluid streams can be represented by lines. A person of ordinary skill will understand that fluid streams can be conveyed by various means, including but not limited to pipes, conduit, channels, and their attachments and fittings. Though other equipment, such as pumps, valves, heat exchangers, storage tanks, controllers, and so forth, may be present in various embodiments, such equipment is not shown in the figures for the sake of clarity.

As used in this disclosure, the term "light olefin products" refers to unsaturated light hydrocarbons (that is, C2-C4) containing one or more double carbon-carbon bonds in their molecules. Examples of light olefin products include ethene (sometimes referred to as ethylene), propene (sometimes referred to as propylene), and butene (sometimes referred to as butylene).

As used in this disclosure, the codes BEA, FAU, MFI, and USY are framework type codes used to describe certain catalyst frameworks as defined by the International Union of Pure and Applied Chemistry (IUPAC) on nomenclature for ordered microporous materials.

Most modern steam crackers are configured to maximize the yield of ethene from ethane, light petroleum gas (LPG), naphtha, or gas oils; with lesser amounts of propene and other light olefins as byproducts. But steam cracking processes are generally nonselective and energy intensive. Rising demand for light olefins, such as ethene, propene, and butenes, has prompted some petrochemical producers to consider efficient alternatives to steam cracking. Fluid catalytic cracking is a more energy efficient process than steam cracking, but feedstock to a FCC process must be screened for levels of potential contaminants such as coke, acids, and poisoning heavy metals which can deactivate the FCC catalyst.

This disclosure provides methods for steam-assisted FCC processes that are capable of processing hydrocarbon feeds such as whole crude oil and natural gas condensate (including associated gas condensate, nonassociated gas condensate, or both) to produce light olefin products such as ethene, propene, and butenes. While conventional FCC processes are typically carried out in a riser reactor, the disclosed methods involve downer technology. In conventional riser reactors, solid catalyst and hydrocarbon vapors flow upward against gravity. Because the upward flow of catalyst is significantly slower than the flow of hydrocarbon vapors, the catalyst generally has a greater residence time than the hydrocarbon vapors. The greater catalyst residence time can lead to undesirable secondary reactions.

On the other hand, the flow of catalyst and hydrocarbon vapors in a downflow reactor is in the direction of gravity and the residence time of the catalyst and hydrocarbon vapors is substantially the same. Moreover, the amount of time that the hydrocarbon vapors are contacted with the catalyst is more easily controlled, and even distribution of catalyst is more easily obtained in a downflow reactor than a riser. It has been found that the yield of light olefin products such as propene can be increased by combining the hydrocarbon feed to a downflow FCC reactor with steam. Advantageously, combining the hydrocarbon feed with steam results in a reduced hydrocarbon feed partial pressure, which facilitates hydrocarbon cracking. Also, the methods disclosed can be carried out at lower temperatures and with less energy loss than conventional steam cracking processes, while improving selectivity to desirable light olefin products.

Though conventional processes use steam with a hydrocarbon feed to assist with fluidization and feed atomization, the amount of steam used in conventional processes is generally limited to small amounts (e.g., about 1-5 wt %) because steam can adversely affect the stability of certain catalysts. In contrast, the disclosed methods use a modified catalyst which has improved activity and stability under high temperatures and with greater concentrations of steam than conventional catalysts and FCC processes. Using an FCC catalyst having a modified catalyst facilitates greater steam content in the FCC process. In at least one embodiment, the weight ratio of steam-to-hydrocarbon feed can be between about 0.05 and 1.0, alternately between about 0.1 and 1.0, alternately between about 0.2 and 1.0, preferably between about 0.3 and 1.0. The weight ratio of steam to hydrocarbon feed depends on the type of hydrocarbon feed that is used; with heavier feeds requiring more steam and lighter feeds requiring less.

By cracking the hydrocarbon feed with steam in these amounts, bimolecular reactions, such as hydrogen transfer, aromatization, and polymerization can be reduced compared with conventional FCC processes. Not intending to be limited by theory, it is believed that bimolecular reactions are reduced by combining the hydrocarbon feed with steam because the reactants for such reactions are significantly diluted. In addition to reducing bimolecular reactions, the steam can accelerate the gasification of coke deposits on the FCC catalyst surface, reducing coke yield and prolonging FCC catalyst activity. Also, the steam can facilitate the reaction of carbonium ions, leading to the production of propene and butene.

In conventional systems, environments having active olefin products generally include conditions that tend to cause catalyst deactivation by coke formation and dealumination of zeolite catalysts. The long-term performance and stability of conventional catalysts can also be hindered by carrying out steam cracking in the FCC process. Fluid catalytic cracking catalysts having a modified catalyst for use in steam-enhanced catalytic cracking processes are provided in this disclosure. The modified catalysts can be modified by phosphorus impregnation, rare earth metal ion exchange and impregnation, increasing hydrophobicity of the zeolite by increasing the ratio of silicon to aluminum in the zeolite, or a combination of these. The modified catalyst can have suitable activity and selectivity characteristics for the production of olefins, and can be suitable for use in the disclosed steam-enhanced catalytic cracking processes. The modified catalyst can be characterized as mechanically robust and thermally stable under the steam-enhanced catalytic cracking conditions provided in this disclosure.

The modified catalyst can include a zeolite that has been impregnated with phosphorus and one or more metal oxides. In at least one embodiment, the zeolite can be selected from the group consisting of MFI framework type zeolites (e.g., ZSM-5), FAU framework type zeolites (e.g., ultrastable zeolite Y (USY)), BEA framework type zeolites (e.g., as zeolite beta), and combinations of the same. In at least one embodiment, the one or more metal oxides can include a metal in a +3 oxidation state, such as iron (III), nickel (III), lanthanum (III), and cerium (III). The modified catalyst can have phosphorus pentoxide ($P_2O_5$) content between about 1 wt % and about 20 wt %. In at least one embodiment, the total metal oxide content of the modified catalyst can be between about 0.5 wt % and about 5 wt %, preferably between about 0.5 wt % and about 2 wt %.

The modified catalyst can be prepared by a process that includes mixing a zeolite with a phosphorus precursor in water to obtain a phosphorus precursor slurry. The mixing can be carried out at ambient temperature (such as between about 15° C. and about 30° C.). The zeolite can be selected from the group consisting of MFI framework type zeolites (e.g., ZSM-5), FAU framework type zeolites (e.g., USY), BEA framework type zeolites (e.g., zeolite beta), and combinations of the same. The phosphorus precursor can be an oxygenated phosphorus compound such as simple oxides, phosphate anions, phosphate salts, complex species including one or more metals and phosphorus linked to oxygen, or any combination of the same. In at least one embodiment, the phosphorus precursor can be phosphoric acid ($H_3PO_4$), ammonium hydrogen phosphates (e.g., diammonium phosphate [$(NH_4)_2HPO_4$]), or any combination of the same. After mixing, the phosphorus precursor slurry is dried. In at least one embodiment, the drying is carried out at a temperature between about 50° C. and about 150° C. The dried phosphorus precursor slurry is then calcined at a temperature between about 450° C. and about 650° C., preferably between about 500° C. and about 600° C., to obtain a phosphorus impregnated zeolite. The calcining can be carried out for a period of time that is between about 2 hours and about 10 hours, preferably between about 4 hours and about 8 hours.

The phosphorus impregnated zeolite is mixed with a metal precursor in water at ambient temperature to obtain a metal precursor slurry. The metal precursor can include a metal in a +3 oxidation state, such as iron (III), nickel (III), lanthanum (III), and cerium (III). In at least one embodiment, the metal precursor can include a metal compound selected from the group consisting of nitrates having a metal cation in a +3 oxidation state (e.g., lanthanum (III) nitrate [$La(NO_3)_3$], cerium (III) nitrate [$Ce(NO_3)_3$], iron (III) nitrate [$Fe(NO_3)_3$], nickel (III) nitrate [$Ni(NO_3)_3$]), their hydrates, water-soluble salts (e.g., halides, acetates, sulfates, chlorates, bromates, etc.) having a metal cation in a +3 oxidation state (e.g., lanthanum (III) chloride [$LaCl_3$], lanthanum (III) acetate [$La(C_2H_3O_2)_3$], lanthanum (III) bromate [$La(BrO_3)_3$], iron (III) chloride [$FeCl_3$], iron (III) fluoride [$FeF_3$], iron (III) chlorate [$Fe(ClO_3)_3$], cerium (III) chloride [$CeCl_3$], cerium (III) sulfate [$Ce_2(SO_4)_3$], cerium (III) acetate [$Ce(C_2H_3O_2)_3$], etc.), their hydrates, and any combination of the same. The metal precursor slurry is then dried at a temperature in the range of about 50° C. and about 150° C. The dried metal precursor slurry is then calcined at a temperature between about 450° C. and about 650° C., preferably between about 500° C. and about 600° C., to obtain a metal oxide impregnated zeolite. The calcining can be carried out for a period of time that is between about 2 hours and about 10 hours, preferably between about 4 hours and about 8 hours.

The order in which the zeolite is impregnated with phosphorus and one or more metal oxides is not particularly limited. While this disclosure describes impregnating the zeolite with phosphorus first and then metal oxide, a person of ordinary skill will understand that the zeolite can be impregnated with one or more metal oxides before being impregnated with phosphorus, after being impregnated with phosphorus, or both (i.e., the zeolite can be impregnated with at least one metal oxide before, and at least one metal oxide after being impregnated with phosphorus).

After impregnating the zeolite with phosphorus and one or more metal oxides to obtain a modified catalyst, the modified catalyst can be combined with other components such as clay matrix slurry and peptized alumina binder to obtain a modified catalyst slurry. The modified catalyst slurry can be spray dried and calcined to obtain the FCC catalyst. The calcining can be carried out at a temperature between about 450° C. and about 650° C., preferably between about 500° C. and about 600° C. The calcining can be carried out for a period of time that is between about 2 hours and about 10 hours, preferably between about 4 hours and about 8 hours.

The FCC catalyst can include the modified catalyst, and other components such as clay matrix, binder, and filler. The FCC catalyst can include between about 10 wt % and about 50 wt % modified catalyst, preferably between about 30 wt % and about 40 wt %. The FCC catalyst can include a mixture of modified catalysts. In at least one embodiment, the FCC catalyst can include a modified catalyst having a ZSM-5 catalyst impregnated with phosphorus and metal, a zeolite beta catalyst impregnated with phosphorus and metal, a USY catalyst impregnated with phosphorus and metal, or combinations of the same. In some embodiments, the modified catalyst portion of the FCC catalyst includes a modified ZSM-5 catalyst, a modified zeolite beta catalyst, and a modified USY catalyst with a ratio of about 1:2:1. In some embodiments, the modified catalyst portion of the FCC catalyst includes a modified ZSM-5 catalyst, a modified zeolite beta catalyst, and a modified USY catalyst with a ratio of about 1:3:4. In some embodiments, the modified catalyst portion of the FCC catalyst includes a modified ZSM-5 catalyst, a modified zeolite beta catalyst, and a modified USY catalyst with a ratio of about 1:4:4.

Figure 2:
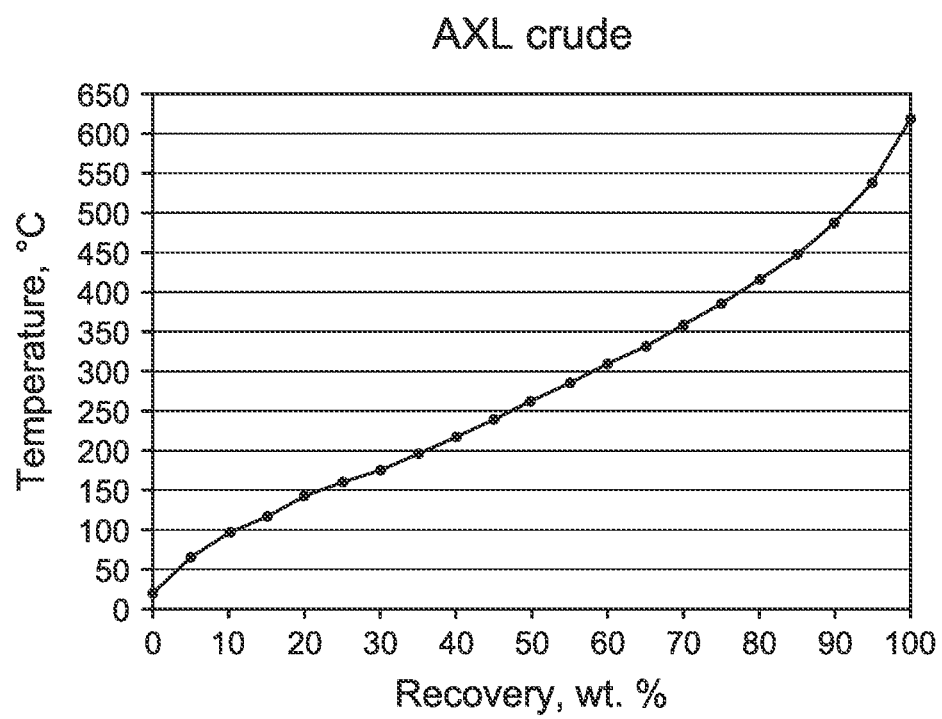
FIG. 2 is a plot showing weight percent of oil that is recovered by simulated distillation of Arabian extra light whole crude oil.
Figure 3:
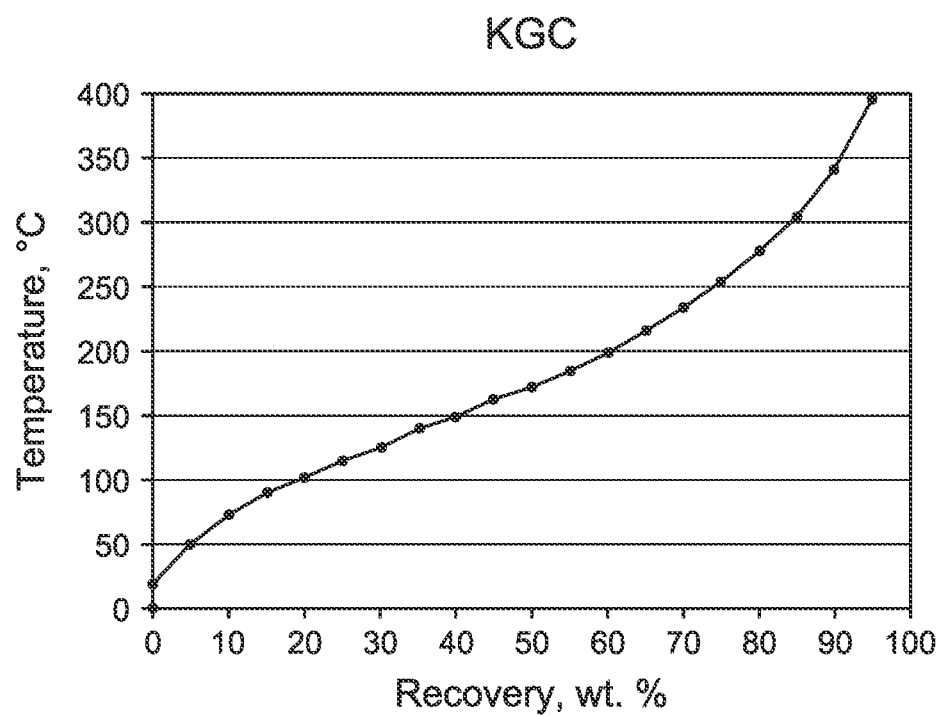
FIG. 3 is a plot showing weight percent of gas condensate that is recovered by simulated distillation of Khuff gas condensate.

FIG. 1 shows an embodiment of a steam-assisted catalytic cracking process 100 for obtaining light olefin products from a hydrocarbon feed. In FIG. 1, a hydrocarbon feedstream 101 having a hydrocarbon feed is combined with steam from steam stream 103. The hydrocarbon feed and steam can be combined before being introduced to the downflow FCC reactor, in a mixing zone of the downflow FCC reactor, or by direct injection into the downflow FCC reactor. In at least one embodiment, the hydrocarbon feed can be preheated before being introduced to the downflow FCC reactor. In at least one embodiment, the hydrocarbon feed can be gas condensate, such as gas condensate available from the Khuff geological formation. In at least one embodiment, the hydrocarbon feed can be Arabian extra light (AXL) whole crude oil. Boiling point ranges and fractions for samples of AXL whole crude oil and Khuff gas condensate are shown in FIG. 2 and FIG. 3, which are plots showing weight percent recovered by the simulated distillation of the respective feeds. According to FIG. 2, AXL Whole crude boils at temperatures between about 20° C. and about 620° C. According to FIG. 3, Khuff gas condensate boils at temperatures between about 20° C. and about 400° C. Table 1 shows properties of example hydrocarbon feeds.

TABLE 1

Examples of suitable hydrocarbon feeds and their properties.

| Property | AXL whole crude oil | Khuff gas condensate |
|---|---|---|
| API gravity, degrees | 39.6 | 52.4 |
| Density, g/mL | 0.829 | 0.770 |
| Sulfur | 0.81 wt % | 271 ppmw |
| Fractions, wt % | | |
| Naphtha (0-221° C.) | 40.8 | 66.6 |
| Liquid cycle oil (221-343° C.) | 26.3 | 23.7 |
| Slurry (343+ ° C.) | 32.9 | 9.7 |

AXL, Arabian extra light

The combined hydrocarbon feed and steam can have a mass ratio of steam to hydrocarbon feed that is between about 0.05 and 1.0, alternately between about 0.1 and 1.0, alternately between about 0.2 and 1.0, preferably between about 0.3 and about 1.0. The combined hydrocarbon feedstream 101 and steam stream 103 are introduced to downflow FCC reactor 120 along with FCC catalyst from FCC catalyst stream 152. The FCC catalyst can include a modified catalyst. The downflow FCC reactor 120 is operated at a cracking temperature and with a residence time that is sufficient to crack the hydrocarbon feed in the presence of the FCC catalyst. In at least one embodiment, the cracking temperature can be between about 600° C. and about 750° C., alternately between about 650° C. and 750° C., alternately between about 600° C. and about 670° C., alternately between about 650° C. and 670° C. In at least one embodiment, the residence time of the hydrocarbon feed and FCC catalyst in the downflow FCC reactor 120 can be between about 0.05 and 10 seconds, alternately between about 0.1 and 5 seconds.

The hydrocarbon feed from the hydrocarbon feedstream 101 reacts in the presence of the FCC catalyst from regenerated catalyst stream 132 and steam from steam stream 103 in the downflow FCC reactor 120. Large hydrocarbon molecules from the hydrocarbon feed are broken into smaller hydrocarbon molecules to produce light olefin products. The steam serves as a diluent to reduce the partial pressure of the hydrocarbon feed, thus reducing the potential for bimolecular reactions and targeting the production of light olefins products. Generally, coke and hydrocarbon deposits on the FCC catalyst as the reaction proceeds, eventually reducing the activity of the FCC catalyst. But the presence of steam in significant quantities helps to delay deactivation of the FCC catalyst from coke and hydrocarbon deposits.

The downflow FCC reactor 120 produces an FCC effluent that includes the light olefin products and steam. The FCC effluent exits the downflow FCC reactor 120 in FCC effluent stream 121, and is sent to a separator 150 to obtain the light olefin products. In at least one embodiment, the separator 150 is a fractionator. The separator 150 separates the FCC effluent stream 121 to obtain a light fraction 151 including the light olefin products, and a heavy fraction 152.

Ultimately, coke and hydrocarbons deposit on the FCC catalyst in the downflow FCC reactor 120, significantly reducing the activity of the FCC catalyst. Such catalyst is referred to as spent FCC catalyst in this disclosure. The spent FCC catalyst is collected in downflow FCC reactor 120, and conveyed to stripper 130 where steam from stripping steam stream 131 is used to strip hydrocarbon deposits from the spent FCC catalyst to obtain a hydrocarbon-stripped FCC catalyst. In at least one embodiment, the spent FCC catalyst is gravity fed to the stripper. The stripped hydrocarbons and steam exit the stripper in stripper effluent stream 133. In at least one embodiment, the stripper effluent stream 133 is recycled and combined with hydrocarbon feedstream 101. The hydrocarbon-stripped FCC catalyst exits the stripper 130 in hydrocarbon-stripped FCC catalyst stream 132 and is sent to regenerator 140.

Regenerator 140 receives air from air feed stream 141, and regenerates the hydrocarbon-stripped FCC catalyst by combusting the remaining coke deposits with air to obtain regenerated FCC catalyst. Gases resulting from the combustion of the coke deposits exit the regenerator 140 in regenerator effluent stream 143. The regenerated FCC catalyst exits the regenerator 140 in regenerated FCC catalyst stream 142, and is recycled to the downflow FCC reactor 120. In at least one embodiment, a makeup FCC catalyst stream 144 delivers makeup FCC catalyst to the process. The makeup FCC catalyst from makeup FCC catalyst stream 144 can be combined with regenerated FCC catalyst stream 142 before being fed to the downflow FCC reactor 120. Because the regenerated FCC catalyst is heated in the process of combusting coke deposits, a person of ordinary skill in the relevant art will appreciate that the flow of regenerated FCC catalyst and makeup FCC catalyst in regenerated FCC catalyst stream 142 and makeup FCC catalyst stream 144 respectively can be controlled to achieve a suitable heat balance and temperature in the downflow FCC reactor.

Figure 4:
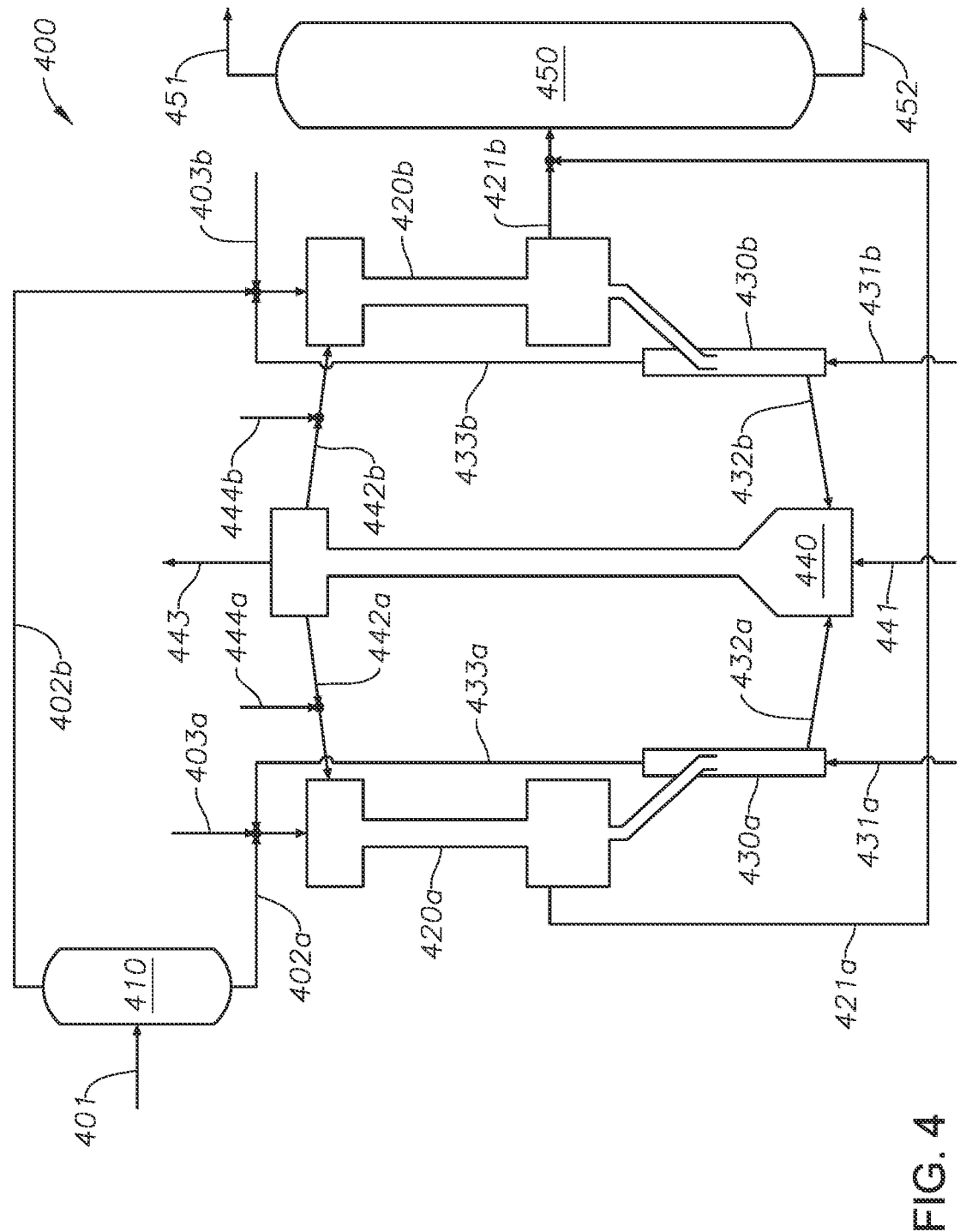
FIG. 4 is a diagram of an embodiment of a steam-assisted catalytic cracking process having separate downflow FCC reactors for obtaining light olefin products from a hydrocarbon feed, and a single regenerator for regenerating spent FCC catalyst.

FIG. 4 shows an embodiment of a steam-assisted catalytic cracking process 400 having separate downflow fluid catalytic cracking reactors for obtaining light olefin products from a hydrocarbon feed. The process disclosed is generally suitable for hydrocarbons having a wide boiling range, such as whole crude oil or gas condensate. Examples of suitable hydrocarbon feeds include AXL whole crude oil and Khuff gas condensate. In FIG. 4, a dual downer configuration allows the hydrocarbon feed to be divided into light and heavy fractions, and catalytically cracked separately in separate downflow FCC reactors. By dividing the hydrocarbon feed, the individual downflow FCC reactors can be configured to operate at conditions and with FCC catalysts tailored to the respective light and heavy fractions.

In FIG. 4, a hydrocarbon feedstream 401 having a hydrocarbon feed is separated in feed separator 410 to obtain a light hydrocarbon feed fraction and a heavy hydrocarbon feed fraction. In at least one embodiment, the feed separator 410 can be a flash drum. According to at least one embodiment, the light and heavy fractions can be separated using a cut point in the range of about 330-380° C. That is, the heavy fraction boils at a temperature greater than, and the light fraction boils at a temperature less than a temperature in the range of about 330-380° C. In at least one embodiment, the hydrocarbon feed can be AXL whole crude oil. In at least one embodiment, the hydrocarbon feed can be Khuff gas condensate. The heavy hydrocarbon feed fraction leaves the feed separator 410 in heavy hydrocarbon feed stream 402*a*, and the light hydrocarbon feed fraction leaves in light hydrocarbon feed stream 402*b*. The heavy hydrocarbon feed fraction and light hydrocarbon feed fraction are combined with steam from first steam stream 403*a* and second steam stream 403*b* respectively. In at least one embodiment, the heavy hydrocarbon feed stream 402*a* and light hydrocarbon feed stream are preheated after leaving the feed separator 410 and before entering the first downflow FCC reactor 420*a*. The yield of light olefins can be altered by varying the ratio of steam to hydrocarbon feed. For example, a greater yield of light olefins can be obtained by increasing the ratio of steam to hydrocarbon feed. A greater steam-to-hydrocarbon feed ratio can result in a reduction in the partial pressure of hydrocarbon feed vapor, which favors cracking hydrocarbons into low molecular weight products. Moreover, a greater ratio of steam to hydrocarbon feed can assist with maintaining FCC catalyst activity by inhibiting coking reactions on the FCC catalyst surface. In practice, however, the ratio of steam to hydrocarbon feed will be limited by energy constraints, limits on equipment size, and other constraints related to subsequent condensation and separation of products. In at least one embodiment, the combined heavy hydrocarbon feed and steam can have a mass ratio of steam to hydrocarbon feed that is between about 0.5 and 1.0. In at least one embodiment, the combined light hydrocarbon feed and steam can have a mass ratio of steam to hydrocarbon feed that is between about 0.3 and 1.0, alternately between about 0.3 and 0.8.

The light hydrocarbon feed and heavy hydrocarbon feed are introduced with steam to the first downflow FCC reactor 420*a* and the second downflow FCC reactor 420*b* respectively. FCC catalyst from first regenerated FCC catalyst stream 442*a* and second regenerated FCC catalyst stream 442*b* are introduced simultaneously to the first and second downflow FCC reactors 420*a* and 420*b* respectively, along with the respective light hydrocarbon feed and heavy hydrocarbon feed. The FCC catalyst can include a modified catalyst. Because the first and second FCC catalyst are regenerated in the same regenerator, the first and second FCC catalyst can have a composition that is substantially the same.

The first downflow FCC reactor 420*a* is operated at a temperature between about 630° C. and about 750° C. The second downflow FCC reactor 420*b* is operated at a temperature between about 600° C. and about 720° C., alternately between about 600° C. and about 680° C., alternately between about 650° C. and about 720° C. According to at least one embodiment, the first downflow FCC reactor 420*a* (where the light hydrocarbon feed is cracked) is operated at a temperature that is greater than the operating temperature of the second downflow FCC reactor 420*b* (where the heavy hydrocarbon feed is cracked). In at least one embodiment, the residence time of the hydrocarbon feed and FCC catalyst in the first and second downflow FCC reactors 420*a* and 420*b* can be between about 0.05 and 10 seconds, alternately between about 0.5 and 5 seconds.

The light hydrocarbon feed reacts in the presence of the first FCC catalyst and steam in the first downflow FCC reactor 420*a*. The first downflow FCC reactor 420*a* produces first cracked hydrocarbons and first spent FCC catalyst similar to the process shown and described in FIG. 1. Similarly, the second downflow FCC reactor 420*b* receives the heavy hydrocarbon feed and cracks it to produce second cracked hydrocarbons and second spent FCC catalyst similar to the process shown in FIG. 1. The first cracked hydrocarbons and steam exit the first downflow FCC reactor 420a in first FCC effluent stream 421a, and the second cracked hydrocarbons and steam exit the second downflow FCC reactor 420b in second FCC effluent stream 421b. The first FCC effluent stream 421a and second FCC effluent stream 421b are sent to separator 450 where they are separated to obtain a light cracked fraction that includes the light olefin products, and a heavy cracked fraction. In at least one embodiment, the separator 450 is a fractionator. The light cracked fraction exits the separator 450 in light cracked fraction stream 451, and the heavy cracked fraction exits the separator 450 in heavy cracked fraction stream 452.

The first spent FCC catalyst and second spent FCC catalyst are conveyed to a first stripper 430a and a second stripper 430b respectively, where hydrocarbon deposits are stripped from the first and second spent FCC catalyst using steam from first and second stripping steam streams 431a and 431b respectively similar to the process shown and described in FIG. 1 to obtain first and second hydrocarbon-stripped FCC catalysts respectively. The stripping steam and stripped hydrocarbons exit the first and second strippers 430a and 430b in first and second stripper effluent streams 433a and 433b respectively. In at least one embodiment, the first and second stripper effluent streams 433a and 433b are recycled and combined with the heavy hydrocarbon feed and light hydrocarbon feed respectively.

The first and second hydrocarbon-stripped FCC catalysts leave the first and second strippers 430a and 430b in first and second hydrocarbon-stripped FCC catalyst streams 432a and 432b respectively, and are sent to regenerator 440. Regenerator 440 receives air from air feed stream 441, and regenerates the first and second hydrocarbon-stripped FCC catalyst by combusting remaining coke deposits on the hydrocarbon-stripped FCC catalyst with air to obtain regenerated FCC catalyst. Gases resulting from the combustion of the coke deposits exit the regenerator 440 in regenerator effluent stream 443. The regenerated FCC catalyst exits the regenerator 440 in first and second regenerated FCC catalyst streams 442a and 442b, and is recycled to the first and second downflow FCC reactors 420a and 420b respectively.

In at least one embodiment, first and second makeup FCC catalyst streams 444a and 444b respectively, deliver makeup FCC catalyst to the first and second downflow FCC reactors 420a and 420b. The makeup FCC catalyst can be combined with first or second regenerated FCC catalyst streams 442a and 442b before being fed to the first and second downflow FCC reactors 420a and 420b respectively. Because the regenerated FCC catalyst is heated in the process of combusting coke deposits, a person of ordinary skill in the relevant art will appreciate that the flow of regenerated FCC catalyst and makeup FCC catalyst in first and second regenerated FCC catalyst streams 442a and 442b and first and second makeup FCC catalyst streams 444a and 444b can be controlled to achieve a suitable heat balance and temperature in the downflow FCC reactor.

Figure 5:
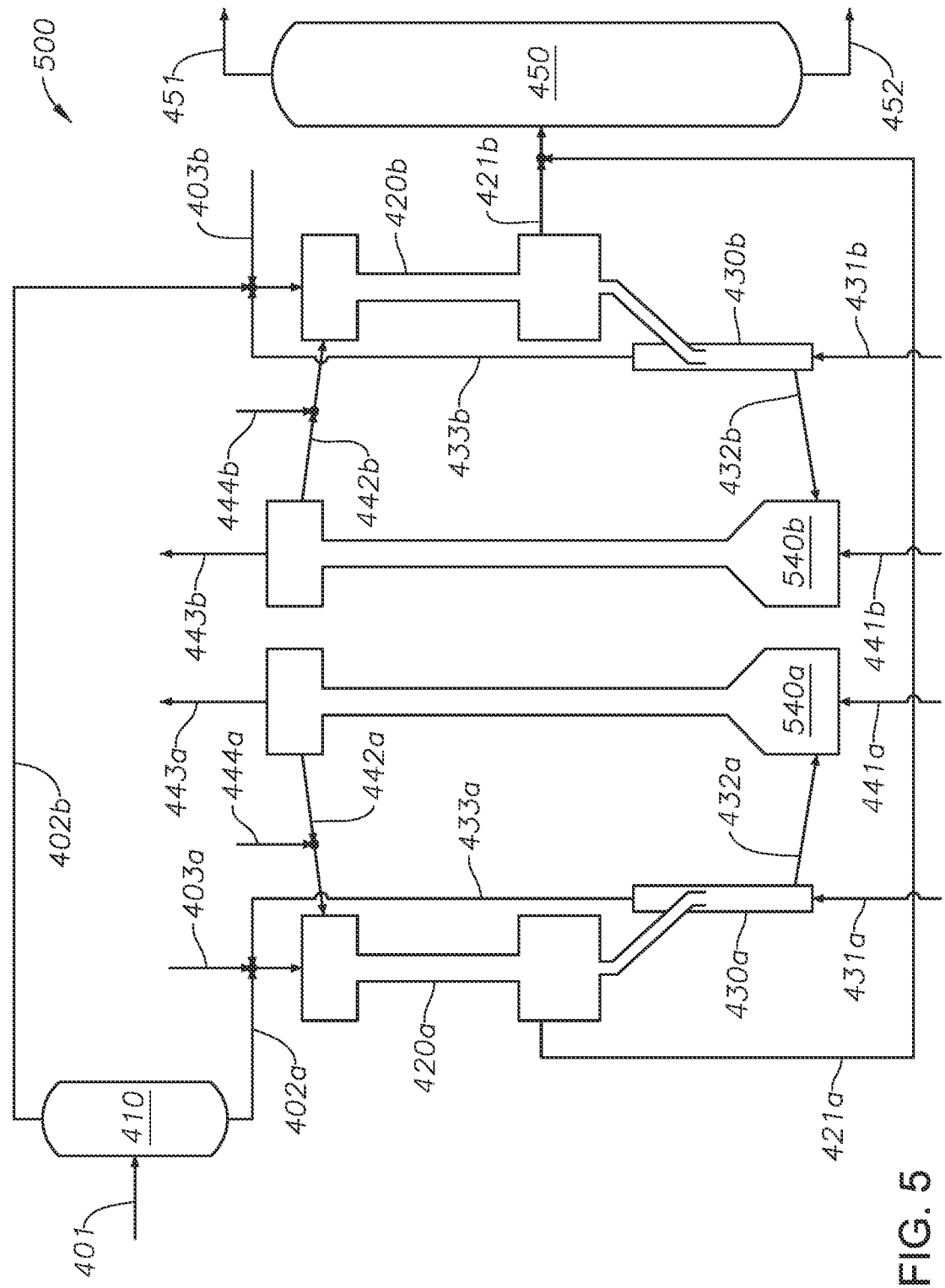
FIG. 5 is a diagram of an embodiment of a steam-assisted catalytic cracking process having separate downflow FCC reactors for obtaining light olefin products from a hydrocarbon feed, and separate regenerators for regenerating spent FCC catalyst.

FIG. 5 shows an embodiment of a steam-assisted catalytic cracking process 500 having separate downflow fluid catalytic cracking reactors for obtaining light olefin products from a hydrocarbon feed 501, and separate regenerators 540a and 540b. The process of FIG. 5 is carried out similar to the process of FIG. 4, except that the hydrocarbon-stripped FCC catalyst is regenerated separately in first and second regenerators 540a and 540b. In this configuration, suitable FCC catalysts can be selected for the individual feed and operating conditions of the first and second downflow FCC reactors 520a and 520b.

In FIG. 5, a dual downer configuration allows the hydrocarbon feed to be divided into light and heavy fractions, and catalytically cracked separately in separate downflow FCC reactors. By dividing the hydrocarbon feed, the individual downflow FCC reactors can be configured to operate at conditions and with FCC catalysts tailored to the respective light and heavy fractions. According to at least one embodiment, the hydrocarbon feed can be separated into light and heavy fractions using flash separation or distillation. According to at least one embodiment, the light and heavy fractions can be separated using a cut point in the range of about 330-380° C.

In FIG. 5, a hydrocarbon feedstream 501 having a hydrocarbon feed is separated in feed separator 510 to obtain a light hydrocarbon feed fraction and a heavy hydrocarbon feed fraction. The light and heavy hydrocarbon feed reactions are processed in first and second downflow FCC reactors 520a and 520b respectively, similar to the process shown and described in FIG. 5. After stripping hydrocarbon deposits from first and second spent FCC catalysts in the first and second strippers 530a and 530b, the first and second hydrocarbon-stripped FCC catalysts exit the first and second strippers 530a and 530b in first and second hydrocarbon-stripped FCC catalyst streams 532a and 532b, and are sent to first and second regenerators 540a and 540b.

The first and second hydrocarbon-stripped FCC catalysts are processed in the first and second regenerators 540a and 540b respectively by combusting coke deposits on the hydrocarbon-stripped FCC catalysts with air from respective air feed streams 541a and 541b to obtain first and second regenerated FCC catalysts. The first and second regenerated FCC catalysts leave the first and second regenerators 541a and 541b in first and second regenerated FCC catalyst streams 542a and 542b respectively.

EXAMPLES

The following examples are included to demonstrate embodiments of the disclosure, and should be considered nonlimiting. The techniques and compositions disclosed in the examples which follow represent techniques and compositions discovered to function well in the practice of the disclosure, and thus can be considered to constitute modes for its practice. However, changes can be made to the embodiments disclosed in the examples without departing from the spirit and scope of the disclosure.

Example 1: Steam-Enhanced Catalytic Cracking of Khuff Gas Condensate

Khuff gas condensate was processed in three test runs (Test run 1, Test run 2, and Test run 3) using a fixed bed reactor at a temperature of 675° C. Test run 1 was carried out using steam without a catalyst. Test run 2 was carried out using a mixture of 75 wt % commercial equilibrium catalyst (i.e., a mixture of regenerated FCC catalyst and makeup FCC catalyst; referred to as "Ecat") and 25 wt % modified catalyst. Test run 3 was carried out using steam with a steam-to-feed weight ratio of about 0.5 and the same catalyst mixture used in Test run 2. The modified catalyst was a ZSM-5 catalyst impregnated with metal oxides and about 11.6 wt % phosphorus pentoxide, and sold under the trademark OlefinsUltra®. The modified catalyst contained disodium oxide ($Na_2O$; 0.17 wt %), magnesium oxide (MgO; 0.06 wt %), calcium oxide (CaO; 0.07 wt %), iron(III) oxide ($Fe_2O_3$; 0.59 wt %), lanthanum(III) oxide ($La_2O_3$; 0.03 wt %), and phosphorus pentoxide ($P_2O_5$; 11.6 wt %). OlefinsUltra® is commercially available from W.R. Grace & Co., Grace Dr., Columbia, Md. 21044. The residence time of the Khuff gas condensate for each test run was 10 seconds. The yield from the three test runs is tabulated in Table 2.

TABLE 2

Yield comparison for cracking of Khuff gas condensate using noncatalytic steam cracking (Test run 1), catalytic cracking without steam (Test run 2), and steam-enhanced catalytic cracking (Test run 3).

| | Test run 1 (noncatalytic steam cracking) | Test run 2 (catalytic cracking without steam) | Test run 3 (steam-enhanced catalytic cracking) |
|---|---|---|---|
| C5+ conversion, % | 49.1 | 58.7 | 62.9 |
| Component, wt % | | | |
| Fuel gas ($CH_4$, $H_2$) | 6.3 | 7.8 | 7.7 |
| Ethene ($C_2H_4$) | 13.5 | 15.1 | 17.1 |
| Saturated hydrocarbons (C2—C4) | 3.9 | 4.9 | 4.8 |
| Propene ($C_3H_6$) | 11.7 | 15.9 | 19.7 |
| Butenes ($C_4H_8$) | 9.9 | 11.0 | 9.8 |
| Naphtha | 41.2 | 35.3 | 31.2 |
| Light cycle oil | 7.5 | 4.7 | 5.0 |
| Heavy cycle oil | 2.1 | 1.3 | 0.7 |
| Coke | 3.8 | 4.0 | 3.8 |

As shown in Table 2, light olefins represented about 46.6 wt % of the hydrocarbons produced by the steam-enhanced catalytic cracking process, which is greater than the light olefin content produced by Test run 2 (42.0 wt %), and Test run 1 (35.1 wt %).

Example 2: Steam-Enhanced Catalytic Cracking of AXL Whole Crude Oil

Arabian extra light whole crude oil was processed in three test runs (Test run 4, Test run 5, and Test run 6) using a fixed bed reactor at a temperature of about 675° C. Test run 4 was carried out using thermal cracking without a catalyst or steam. Test run 5 was carried out using a mixture of 75 wt % commercial Ecat and 25 wt % modified catalyst. Test run 6 was carried out using steam with a weight ratio of steam to feed of 0.5, and the same catalyst mixture used in Test run 5. The modified catalyst was a ZSM-5 catalyst impregnated with metal oxides and about 11.6 wt % phosphorus pentoxide, and sold under the tradename OlefinsUltra®). The modified catalyst contained disodium oxide ($Na_2O$; 0.17 wt %), magnesium oxide (MgO; 0.06 wt %), calcium oxide (CaO; 0.07 wt %), iron(III) oxide ($Fe_2O_3$; 0.59 wt %), lanthanum(III) oxide ($La_2O_3$; 0.03 wt %), and phosphorus pentoxide ($P_2O_5$; 11.6 wt %). The residence time of the AXL whole crude oil in the reactor was about 10 seconds in each test run. The results of the three test runs are summarized in Table 3.

TABLE 3

Yield comparison for cracking AXL whole crude oil using noncatalytic thermal cracking (Test run 4); catalytic cracking without steam (Test run 5), and steam-enhanced catalytic cracking (Test run 6).

| | Test run 4 (noncatalytic thermal cracking) | Test run 5 (catalytic cracking without steam) | Test run 6 (steam-enhanced catalytic cracking) |
|---|---|---|---|
| C5+ conversion, % | 51.4 | 65.1 | 68.6 |
| Component, wt % | | | |
| Hydrogen ($H_2$) | 0.1 | 1.3 | 0.7 |
| Methane ($CH_4$) | 7.4 | 8.7 | 7.1 |
| Ethane ($C_2H_6$) | 4.1 | 4.8 | 4.6 |
| Ethene ($C_2H_4$) | 16.2 | 16.2 | 18.8 |
| Propane ($C_3H_8$) | 0.4 | 0.9 | 1.3 |
| Propene ($C_3H_6$) | 13.7 | 14.3 | 19.6 |
| Isobutane ($C_4H_{10}$) | 0.1 | 0.0 | 0.1 |
| n-Butane ($C_4H_{10}$) | 0.1 | 0.2 | 0.3 |
| Butenes ($C_4H_8$) | 7.1 | 9.5 | 7.9 |
| Gasoline | 29.0 | 21.8 | 16.9 |
| Light cycle oil | 11.4 | 8.2 | 9.3 |
| Heavy cycle oil | 8.2 | 4.9 | 5.1 |
| Coke | 2.2 | 9.2 | 8.2 |
| Groups, wt % | | | |
| Fuel gas (Hydrogen, methane, ethane) | 11.7 | 14.8 | 12.4 |
| Liquefied petroleum gas (propane, Isobutane, n-butane) | 21.4 | 25.0 | 29.2 |
| Light olefins (ethene, propene, butenes) | 36.9 | 40.1 | 46.3 |

AXL, Arabian extra light

As shown in Table 3, the steam-enhanced catalytic cracking process (Test run 6) produced a greater light olefin yield (46.3 wt %), compared with noncatalytic thermal cracking (Test run 4; 36.9 wt %) and catalytic cracking without steam (Test run 5; 40.1 wt %). The results shown in Table 3 demonstrate that the disclosed process is suitable for producing light olefin products from AXL whole crude oil.

For further comparison, AXL whole crude oil was processed in a fixed bed reactor at a temperature of 675° C. in three additional test runs that involved steam cracking the AXL whole crude oil without a catalyst (Test run 7), catalytic cracking using a mixture of 75 wt % commercial Ecat and 25 wt % modified catalyst (Test run 8) without steam, and steam-enhanced catalytic cracking using a steam-to-feed weight ratio of 0.5, and the same catalyst mixture used in Test run 8 (Test run 9). The modified catalyst was a ZSM-5 catalyst impregnated with metal oxides and about 11.6 wt % phosphorus pentoxide, and sold under the tradename OlefinsUltra®. The modified catalyst contained disodium oxide ($Na_2O$; 0.17 wt %), magnesium oxide (MgO; 0.06 wt %), calcium oxide (CaO; 0.07 wt %), iron(III) oxide ($Fe_2O_3$; 0.59 wt %), lanthanum(III) oxide ($La_2O_3$; 0.03 wt %), and phosphorus pentoxide ($P_2O_5$; 11.6 wt %). The residence time of the AXL whole crude oil in the reactor was about 10 seconds in each test run. The yield from the three processes is summarized in Table 4.

TABLE 4

Yield comparison for cracking of AXL whole crude oil using noncatalytic steam cracking (Test run 7), catalytic cracking without steam (Test run 8), and steam-enhanced catalytic cracking (Test run 9).

|  | Test run 7 (noncatalytic steam cracking) | Test run 8 (catalytic cracking without steam) | Test run 9 (steam-enhanced catalytic cracking) |
|---|---|---|---|
| C5+ conversion, % | 51.4 | 59.8 | 68.7 |
| Component, wt % |  |  |  |
| Fuel gas ($CH_4$, $H_2$) | 7.5 | 8.4 | 7.8 |
| Ethene ($C_2H_4$) | 16.2 | 16.3 | 18.8 |
| Saturated hydrocarbons (C2—C4) | 4.7 | 5.7 | 6.4 |
| Propene ($C_3H_6$) | 13.7 | 16.1 | 19.6 |
| Butenes ($C_4H_8$) | 7.1 | 10.7 | 7.9 |
| Naphtha | 29.0 | 25.6 | 16.9 |
| Light cycle oil | 11.4 | 9.6 | 9.3 |
| Heavy cycle oil | 8.2 | 4.9 | 5.1 |
| Coke | 2.2 | 2.6 | 8.2 |

AXL, Arabian extra light

Table 4 shows that the steam-enhanced process using a modified catalyst can produce greater yield of light olefins (Test run 9; 46.3 wt %) from AXL whole crude oil than noncatalytic steam cracking (Test run 7; 37.0 wt %) and catalytic cracking without steam (Test run 8; 43.1 wt %).

Example 3: Processing AXL Whole Crude Oil in a Dual Downflow FCC Reactor Configuration with and without a Modified Catalyst Arabian extra light whole crude oil was processed in a dual downflow FCC reactor configuration according to the process shown and described in FIG. 5. The AXL whole crude oil was first separated in a flash drum to obtain a heavy hydrocarbon feed having a boiling temperature range greater than 350° C. and a light hydrocarbon feed having a boiling temperature range less than 350° C. The light and heavy hydrocarbon feeds were preheated and fed to first and second downflow FCC reactors respectively, which were both operated at 675° C. with a steam-to-feed weight ratio of 0.5. Test run 11 was carried out using only Ecat in both reactors. Test run 12 was carried out using a mixture of 75 wt % commercial Ecat and 25 wt % modified catalyst in both reactors. The modified catalyst had the same composition as the modified catalyst used in Example 2.

TABLE 5

Yield comparison for steam-enhanced catalytic cracking of light and heavy fractions of AXL whole crude oil in a dual downflow FCC reactor configuration with and without a modified catalyst.

|  | Test run 11 without modified catalyst[a] | | Test run 12 with modified catalyst[b] | |
|---|---|---|---|---|
|  | Light fraction[c] | Heavy fraction[d] | Light fraction[c] | Heavy fraction[d] |
| C5+ conversion, % | 50.24 | 50.03 | 55.51 | 53.87 |
| Component, wt % |  |  |  |  |
| Hydrogen sulfide ($H_2S$) | 0.31 | 1.44 | 0.33 | 1.44 |
| Hydrogen ($H_2$) | 0.56 | 0.10 | 0.69 | 0.10 |
| Methane ($CH_4$) | 6.14 | 0.70 | 6.93 | 0.72 |
| Ethane ($C_2H_6$) | 2.64 | 1.44 | 2.87 | 1.47 |
| Ethene ($C_2H_4$) | 15.56 | 8.16 | 16.66 | 8.34 |
| Propane ($C_3H_8$) | 0.64 | 2.31 | 0.55 | 2.40 |
| Propene ($C_3H_6$) | 15.57 | 20.79 | 16.69 | 23.39 |
| Isobutane ($C_4H_{10}$) | 0.10 | 0.59 | 0.19 | 0.61 |
| n-Butane ($C_4H_{10}$) | 0.51 | 0.53 | 0.48 | 0.53 |
| Butenes ($C_4H_8$) | 8.53 | 15.42 | 10.46 | 16.30 |
| Gasoline | 31.46 | 25.66 | 32.44 | 21.88 |
| Light cycle oil | 11.69 | 7.33 | 8.35 | 7.36 |
| Heavy cycle oil | 0.90 | 5.09 | 0.67 | 5.27 |
| Coke | 5.39 | 10.45 | 2.70 | 10.18 |

TABLE 5-continued

Yield comparison for steam-enhanced catalytic cracking of light
and heavy fractions of AXL whole crude oil in a dual downflow
FCC reactor configuration with and without a modified catalyst.

|  | Test run 11 without modified catalyst[a] | | Test run 12 with modified catalyst[b] | |
| --- | --- | --- | --- | --- |
|  | Light fraction[c] | Heavy fraction[d] | Light fraction[c] | Heavy fraction[d] |
| Groups, wt % | | | | |
| Fuel gas (Hydrogen, methane, ethane) | 9.34 | 2.24 | 10.48 | 2.30 |
| Liquefied petroleum gas (propane, Isobutane, n-butane) | 25.34 | 39.63 | 28.37 | 43.23 |
| Light olefins (ethene, propene, butenes) | 39.65 | 44.36 | 43.81 | 48.03 |

AXL, Arabian extra light
FCC, fluid catalytic cracking
Ecat, equilibrium catalyst
[a]100% Ecat.
[b]75% Ecat and 25% modified catalyst.
[c]Boiling temperature range less than 350° C.
[d]Boiling temperature range greater than 350° C.

A yield comparison of test run 11 and test run 12 shows a greater yield of light olefins using the modified catalyst. A mass balance was carried out for test run 11 and test run 12, the results of which are shown in Table 6 and 7 respectively.

TABLE 6

Mass balance for test run 11.

| Overall process | | |
| --- | --- | --- |
|  | Feed | Combined product |
| Vapor fraction | 0.0 | 1.0 |
| Temperature, ° C. | 38 | 676 |
| Pressure,[a] kPa | 106 | 262 |
| Molar flow, lbmol/h | 7,869 | 32,301 |
| Mass flow, lb/h | 1,441,173 | 1,402,807 |

| Light fraction FCC reactor | | | |
| --- | --- | --- | --- |
|  | Light fraction | Steam | Effluent |
| Vapor fraction | 0.7 | 1.0 | 1.0 |
| Temperature, ° C. | 300 | 200 | 679 |
| Pressure,[a] kPa | 899 | 100 | 262 |
| Molar flow, lbmol/h | 6,768 | 25,676 | 22,417 |
| Mass flow, lb/h | 925,109 | 462,554 | 911,105 |

| Heavy fraction FCC reactor | | | |
| --- | --- | --- | --- |
|  | Heavy fraction | Steam | Effluent |
| Vapor fraction | 0.0 | 1.0 | 1.0 |
| Temperature, ° C. | 300 | 200 | 676 |
| Pressure,[a] kPa | 200 | 100 | 262 |
| Molar flow, lbmol/h | 1,101 | 14,323 | 9,884 |
| Mass flow, lb/h | 516,064 | 258,032 | 491,703 |

[a]gauge pressure

In the mass balance shown in Table 6, the difference between the mass flow rate of material fed to the process and that leaves the process can be attributed to coke produced and deposited on the surface of the catalyst.

TABLE 7

Mass balance for test run 12.

| Overall process | | |
| --- | --- | --- |
|  | Feed | Combined product |
| Vapor fraction | 0.0 | 1.0 |
| Temperature, ° C. | 38 | 676 |
| Pressure,[a] kPa | 106 | 262 |
| Molar flow, lbmol/h | 7,869 | 34,880 |
| Mass flow, lb/h | 1,441,173 | 1,433,504 |

| Light fraction FCC reactor | | | |
| --- | --- | --- | --- |
|  | Light fraction | Steam | Effluent |
| Vapor fraction | 0.7 | 1.0 | 1.0 |
| Temperature, ° C. | 300 | 200 | 679 |
| Pressure,[a] kPa | 899 | 100 | 262 |
| Molar flow, lbmol/h | 6,768 | 25,676 | 24,705 |
| Mass flow, lb/h | 925,109 | 462,554 | 940,335 |

| Heavy fraction FCC reactor | | | |
| --- | --- | --- | --- |
|  | Heavy fraction | Steam | Effluent |
| Vapor fraction | 0.0 | 1.0 | 1.0 |
| Temperature, ° C. | 300 | 200 | 676 |
| Pressure,[a] kPa | 200 | 100 | 262 |
| Molar flow, lbmol/h | 1,101 | 14,323 | 10,175 |
| Mass flow, lb/h | 516,064 | 258,032 | 491,69 |

[a]gauge pressure

In the mass balance shown in Table 7, the difference between the mass flow rate of material fed to the process and that leaves the process can be attributed to coke produced and deposited on the surface of the catalyst.

What is claimed is:

1. A steam-assisted catalytic cracking process for obtaining light olefin products from a hydrocarbon feed, the steam-assisted catalytic cracking process comprising the steps of:
introducing the hydrocarbon feed, a modified fluid catalytic cracking (FCC) catalyst, and steam to a downflow FCC reactor with a mass ratio of steam to hydrocarbon feed that is between 0.05 and 1.0, wherein the modified FCC catalyst comprises a modified catalyst, the modified catalyst comprising a zeolite impregnated with a first metal oxide, wherein the first metal oxide comprises a metal selected from the group consisting of: lanthanum and cerium;

cracking the hydrocarbon feed in the presence of the modified FCC catalyst and steam in the downflow FCC reactor at a cracking temperature to produce a cracked hydrocarbon feed and spent FCC catalyst, the cracked hydrocarbon feed comprising light olefin products and the spent FCC catalyst comprising coke deposits and hydrocarbon deposits;

stripping the hydrocarbon deposits from the spent FCC catalyst with steam in a stripper to obtain a hydrocarbon-stripped spent FCC catalyst;

regenerating the hydrocarbon-stripped spent FCC catalyst in a regenerator by subjecting the stripped spent FCC catalyst to heat in the presence of oxygen to combust the coke deposits on the stripped spent FCC catalyst and produce a regenerated FCC catalyst;

recycling the regenerated FCC catalyst to the downflow FCC reactor.

2. The process of claim 1, wherein the cracking temperature is between 600° C. and 750° C.

3. The process of claim 1, wherein the hydrocarbon feed has a residence time between 0.05 and 10 seconds in the downflow FCC reactor.

4. The process of claim 1, further wherein the zeolite is further impregnated with phosphorus.

5. The process of claim 4, wherein the modified catalyst comprises between 1 and 20 wt % phosphorus pentoxide ($P_2O_5$).

6. The process of claim 1, wherein the zeolite is selected from the group consisting of zeolite socony mobil-5 (ZSM-5), zeolite beta, and ultrastable zeolite Y.

7. The process of claim 1, wherein the modified catalyst comprises between 0.5 and 5 wt % of the first metal oxides.

8. The process of claim 1, wherein the first metal oxide comprises the metal in a +3 oxidation state.

9. The process of claim 1, wherein the zeolite is further impregnated with a second metal oxide comprising a second metal selected from the group consisting of iron (III), nickel (III), and combinations of the same.

10. The process of claim 1, wherein the hydrocarbon feed comprises a hydrocarbon selected from the group consisting of natural gas condensate and whole crude oil.

11. The process of claim 1, further comprising fractionating the cracked hydrocarbon feed to obtain the light olefin products.

12. A steam-assisted catalytic cracking process for obtaining light olefin products from a hydrocarbon feed, the steam assisted catalytic cracking process comprising the steps of:

separating the hydrocarbon feed to obtain a light hydrocarbon feed and a heavy hydrocarbon feed;

introducing the light hydrocarbon feed, a FCC catalyst, and steam to a first downflow FCC reactor, wherein a mass ratio of steam to light hydrocarbon feed is between 0.5 and 1.0 and wherein the FCC catalyst comprises a modified catalyst that comprises a zeolite that is impregnated with phosphorus and a first metal oxide, wherein the first metal oxide comprises a metal selected from the group consisting of: lanthanum and cerium;

cracking the light hydrocarbon feed in the presence of the FCC catalyst and steam in the first downflow FCC reactor at a first cracking temperature to produce a first cracked hydrocarbon feed and first spent FCC catalyst;

introducing the heavy hydrocarbon feed, the FCC catalyst, and steam with a mass ratio of steam to heavy hydrocarbon feed that is between 0.3 and 0.1 to a second downflow FCC reactor;

cracking the heavy hydrocarbon feed in the presence of the FCC catalyst and steam in the second downflow FCC reactor at a second cracking temperature to produce a second cracked hydrocarbon feed and second spent FCC catalyst;

wherein the first cracked hydrocarbon feed and the second cracked hydrocarbon feed comprise light olefin products, and the first spent FCC catalyst and the second spent FCC catalyst comprise coke deposits and hydrocarbon deposits;

stripping the hydrocarbon deposits from the first spent FCC catalyst and second spent FCC catalyst with steam to obtain a first hydrocarbon-stripped spent FCC catalyst and a second hydrocarbon-stripped spent FCC catalyst, respectively;

regenerating the first hydrocarbon-stripped spent FCC catalyst and the second hydrocarbon-stripped spent FCC catalyst to obtain a regenerated FCC catalyst.

13. The process of claim 12, wherein the step of separating the hydrocarbon feed to obtain a light hydrocarbon feed and a heavy hydrocarbon feed is carried out using a cut point temperature between 330° C. and 380° C.

14. The process of claim 12, wherein the first cracking temperature is between 630° C. and 750° C.

15. The process of claim 12, wherein the second cracking temperature is between 600° C. and 720° C.

16. The process of claim 12, wherein the light hydrocarbon feed and the heavy hydrocarbon feed have a residence time in the first downflow FCC reactor and second downflow FCC reactor respectively that is between 0.05 and 10 seconds.

17. The process of claim 12, wherein the modified catalyst comprises between 1 and 20 wt % phosphorus pentoxide ($P_2O_5$).

18. The process of claim 12, wherein the zeolite is selected from the group consisting of ZSM-5, zeolite beta, and ultrastable zeolite Y.

19. The process of claim 12, wherein the modified catalyst comprises between 0.5 and 5 wt % of the first metal oxides.

20. The process of claim 19, wherein the zeolite is further impregnated with a second metal oxide comprise-sing a second metal selected from the group consisting of iron (III), nickel (III), and combinations of the same.

21. The process of claim 12, wherein the first metal oxide comprises the metal in a +3 oxidation state.

22. The process of claim 12, wherein the hydrocarbon feed comprises a hydrocarbon selected from the group consisting of natural gas condensate and whole crude oil.

23. The process of claim 12, wherein the first spent FCC catalyst and the second spent FCC catalyst are gravity-fed to a stripper.

* * * * *